Figure 1:
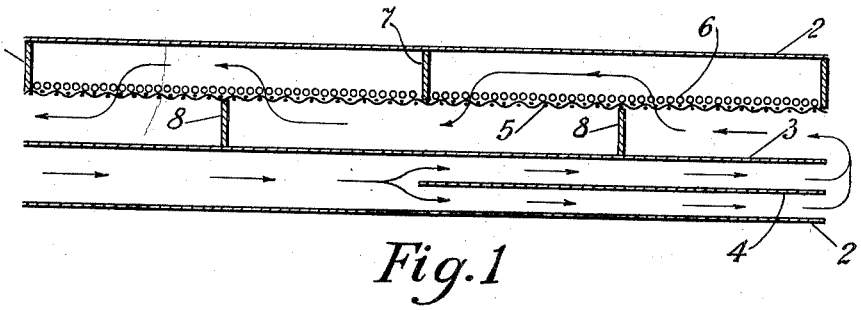

June 24, 1941.                D. M. HURT                    2,246,684
                          CATALYTIC CONVERTER
                           Filed Feb. 9, 1938         4 Sheets-Sheet 1

David M. Hurt INVENTOR.
BY
Albert B. Griggs ATTORNEY

June 24, 1941.  D. M. HURT  2,246,684
CATALYTIC CONVERTER
Filed Feb. 9, 1938  4 Sheets-Sheet 2
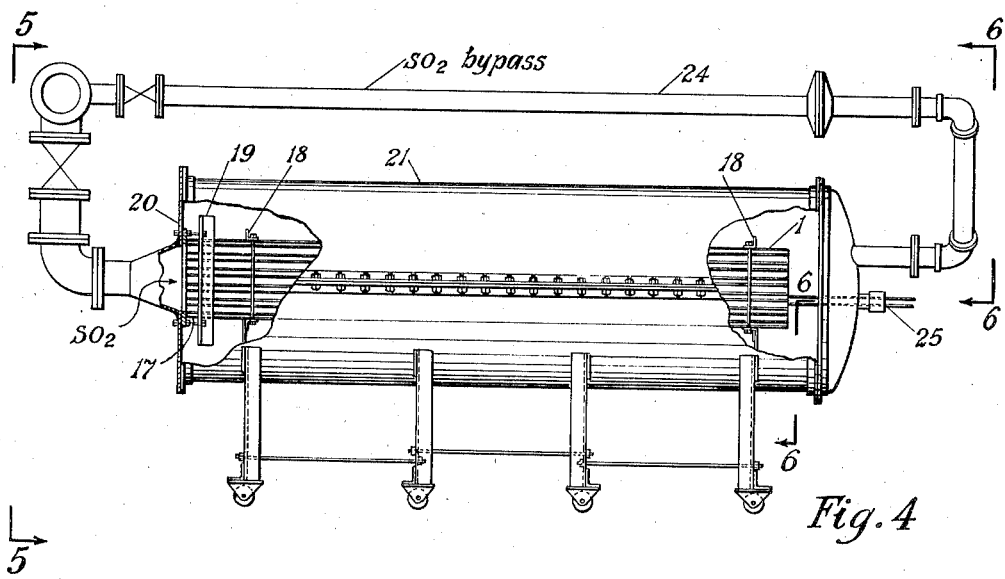
Fig. 4
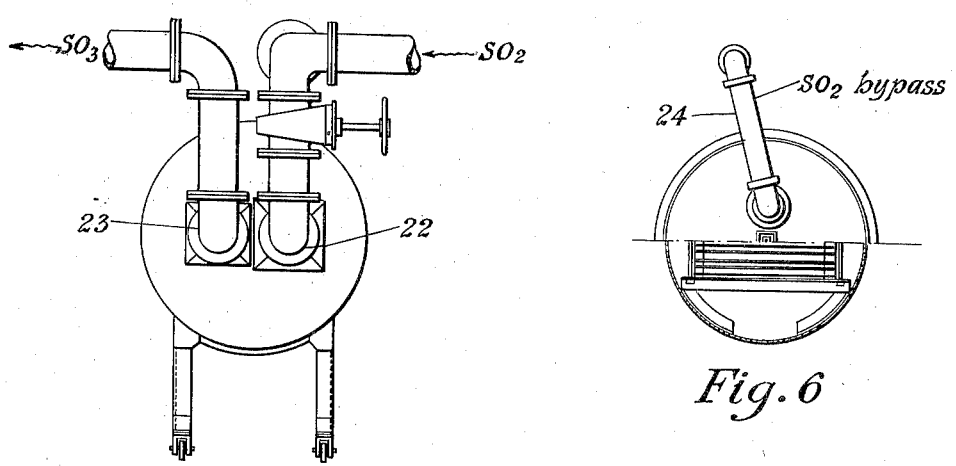
Fig. 5
Fig. 6
David M. Hurt INVENTOR.
BY
Albert B. Griggs  ATTORNEY

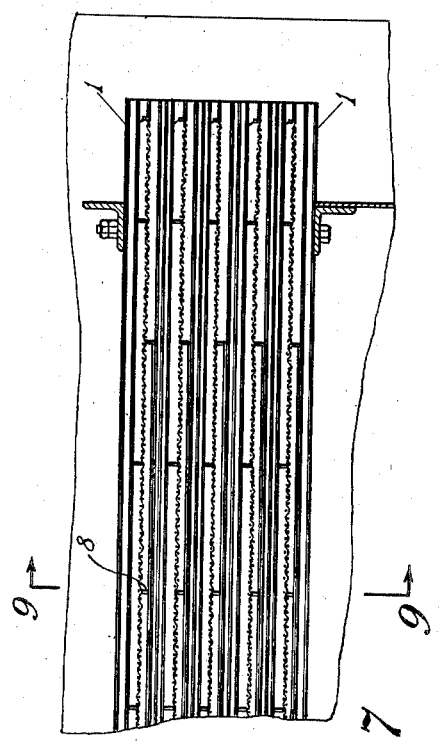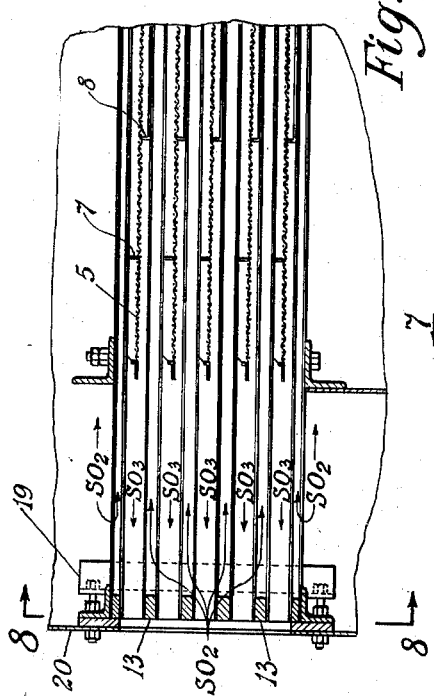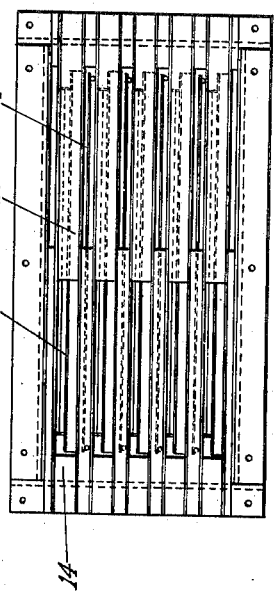

June 24, 1941.　　　D. M. HURT　　　2,246,684
CATALYTIC CONVERTER
Filed Feb. 9, 1938　　　4 Sheets-Sheet 4

David M. Hurt INVENTOR.

BY

Albert B. Griggs　ATTORNEY

Patented June 24, 1941

2,246,684

UNITED STATES PATENT OFFICE 2,246,684

CATALYTIC CONVERTER

David M. Hurt, Cleveland, Ohio, assignor to E. I. du Pont de Nemours & Company, Wilmington, Del., a corporation of Delaware Application February 9, 1938, Serial No. 189,529

11 Claims. (Cl. 23—288)

This invention relates to apparatus for conducting catalytic reactions, and is more particularly directed to catalytic converters of the internal heat exchange type for oxidizing sulfur dioxide to sulfur trioxide.

Internal heat exchange catalytic converters such as those heretofore known effect an uneven and inefficient transfer of heat. Heat must be transferred largely by conduction, mostly thru the catalyst mass. Since the catalyst mass is a very poor conductor of heat, heat exchange is only poorly effected.

At the entry portion of the catalyst where the exothermic reaction proceeds most vigorously, the catalyst becomes over-heated. The customary provision for heat exchange succeeds in cooling the catalyst nearest the walls of the reaction chamber, but catalyst located towards the center of the reaction chamber can lose heat only thru the poorly conductive adjacent catalyst layers.

The same ineffective distribution of heat occurs thruout the whole length of the catalyst bed there being always a considerable temperature gradient thru the catalyst in a direction normal to the flow of gas.

It has been proposed to effect better and more equal distribution of heat by locating a plurality of heat exchange tubes in the catalyst chamber, but this involves complex and expensive apparatus and is only a partial solution to the problem.

The design of an internal heat exchange converter of the type heretofore known is necessarily a compromise. Some of the catalyst must be held at too low a temperature so that other parts of the catalyst will not become too hot, and as a result, very little of the catalyst is used at optimum temperature for maximum effectiveness. The prior practice has necessitated the use of excessive amounts of catalyst with correspondingly large investment costs.

It is an object of my invention to overcome the difficulties heretofore encountered in securing even and effective distribution of heat in internal heat exchange converters. It is a further object of my invention to provide simple and inexpensive apparatus which may be readily installed and easily maintained. A still further object of my invention is to provide apparatus wherein all of the catalyst used can be maintained at desired operating temperatures. A still further object of this invention is to provide apparatus with a minimum amount of heat exchange surface requirement to effect a maximum transfer of heat. Other objects will appear hereinafter.

The objects of my invention are carried out by apparatus having heat exchange passages in which incoming gases are heated and having contiguous catalyst passages within which a single layer of catalyst loses heat by radiation to the passage wall. The catalyst is so distributed in the catalyst passages as to carry out the reaction exactly as desired.

In its more specific aspects my invention is directed to apparatus including a plurality of spaced plates, alternate spaces serving as gas passages for incoming gases and the remaining spaces serving as catalyst passages for a single layer of catalyst. The heat generated in the single layer of catalyst is dissipated by unimpeded radiation to the spaced plates and then transferred to the incoming gases in the contiguous passageways.

Figure 2:
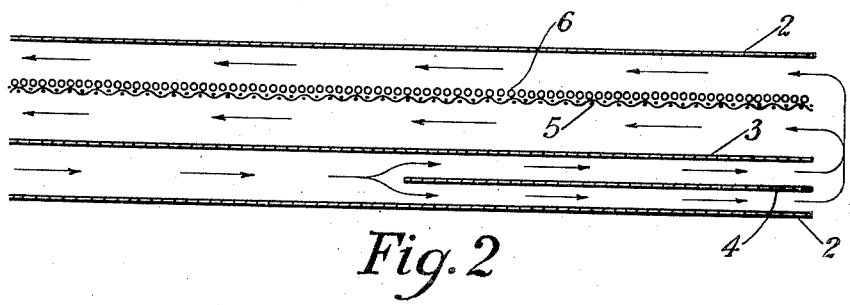
Figure 3:
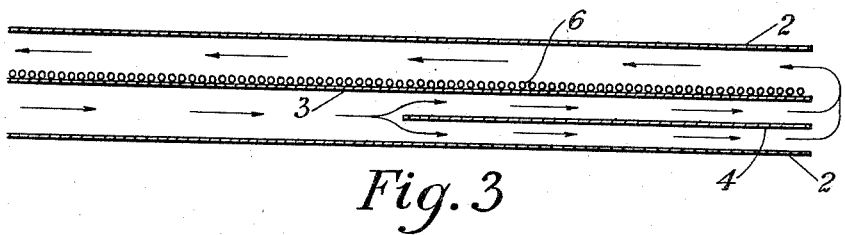
Figure 10:
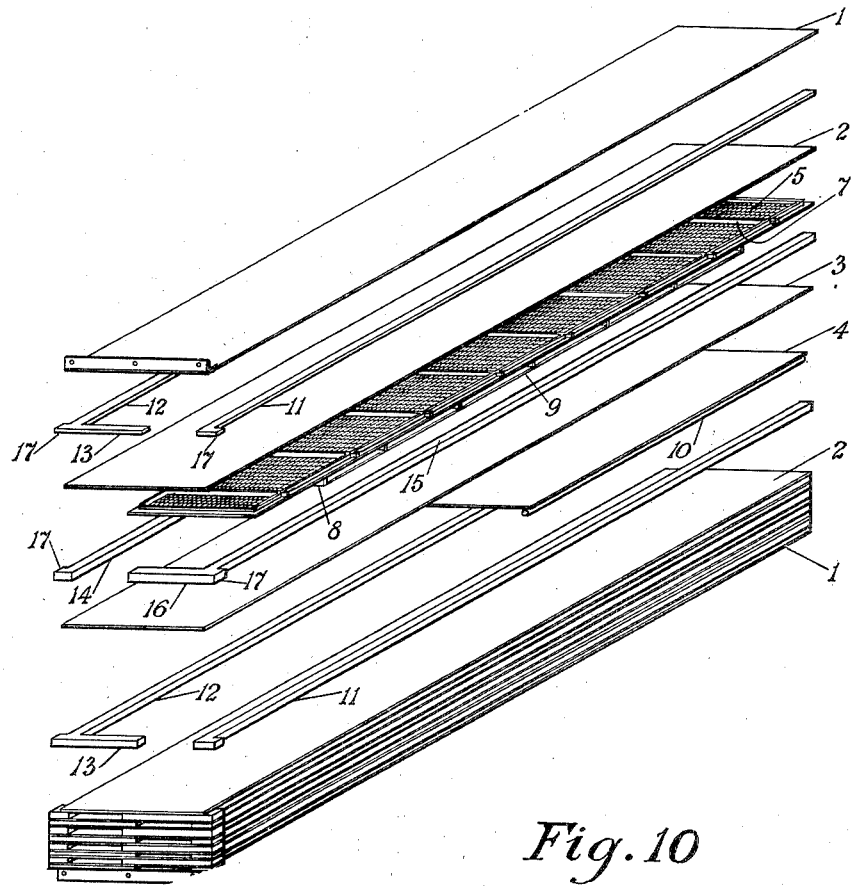

The specific nature of my invention may be better understood by reference to the accompanying illustrative drawings in which:

Figure 1 schematically illustrates the relationship of gas passages in a preferred embodiment of my invention, Figure 2 illustrates a slightly modified arrangement, Figure 3 is a similar schematic showing of a still further modified arrangement, Figure 4 is an elevation of an apparatus of my invention following the schematic arrangement of Figure 1, Figure 5 is an end view of the apparatus of Figure 4, Figure 6 is an end view taken at the back end of the device of Figure 4 as shown, Figure 7 is a longitudinal section of the catalyst and heat exchange pack of Figure 4, the section being taken as indicated on Figure 8, Figure 8 is an end view of the pack of Figure 7, Figure 9 is a sectional view taken along the lines 9—9 of Figure 7, and Figure 10 is an exploded view illustrating the arrangement of plates, spacers, screens, and baffles of the catalytic and heat exchange pack of Figures 7, 8, and 9.

Referring to the drawings in more detail, it is first observed that Figure 1 shows schematically the specific illustrative apparatus of Figures 4, 5, 6, 7, 8, 9, and 10 wherein a single layer of catalyst is located in a passage in such a way that all of the catalyst surface may lose heat directly to the passage walls by unimpeded radiation.

In Figure 1, reading from top to bottom, the plates 2 and 3 shown in section define a catalyst passage, and the plates 3 and 2 in similar way define a gas passage for preheating incoming gases. In the passage 3—2 there is located a baffle 4 which gains heat by radiation and gives up the heat to the incoming gases by conduction. In the catalyst passage 2—3 there is located a screen 5 upon which is distributed a catalyst 6. The flow of reacting gases is caused to pass thru the catalyst by the baffles 7 and 8.

In a catalytic converter constructed as shown in Figure 1 the temperature of the incoming gas may to a considerable extent be controlled by the size of the baffle 4. Heat from the walls 2 and 3 is radiated upon the baffle 4 and the baffle as well as the walls heats the incoming gas.

The single layer of catalyst 6 may lose heat to the walls 2 and 3 by radiation. The distribution of catalyst on the screen 5 should be predetermined so that the desired reaction temperatures are obtained, and in this way all of the catalyst is used effectively and at the desired operating temperatures.

The catalyst 6 may be in any customary form and I have found it quite convenient to use, for example, pelleted magnesium sulfate carrier impregnated with platinum or extruded worms of silica gel impregnated with platinum for the catalytic oxidation of sulfur dioxide to sulfur trioxide. The layer of catalyst should be as thin as possible for, as will be evident, it is important that heat transfer by radiation be unimpeded.

In Figure 2 the schematic showing illustrates a device similar to that of Figure 1 but in which the baffles 7 and 8 are omitted. In a device of this type the turbulence of flow is depended upon to effect contact between the reacting gases and the catalyst. An apparatus of this sort has the advantage that gas resistance is held to a minimum, but the apparatus of Figure 1 will in most instances be found most satisfactory, and it will further be found that the gas resistance is exceedingly low in any event.

In the apparatus of Figure 3 the catalyst layer 6 is placed directly upon the wall 3. Heat can be lost from the catalyst by radiation to the wall 2 and by conduction thru the wall 3.

It will be understood that numerous other such modifications may readily be made by those skilled in the art without departing from the spirit of my invention, since in numerous ways it is possible to locate a single layer of catalyst in a passage so that heat may be transferred by unimpeded radiation to the passage walls.

A specific illustrative apparatus embodying my invention is shown in Figures 4 thru 10. Figure 4 is partly broken away to show the pack of plates which make up the catalytic passages and gas heating passages of the converter. This pack is best shown in Figures 7, 8, 9 and particularly in Figure 10.

By reference to Figure 10 it will be seen that the pack has a plate 1 at the top and that this plate is separated from a plate 2 by separators 11 and 12. The separator 12 is L-shaped, the leg of the L being designated by the reference character 13. When the plates 1 and 2 are in assembled relation as shown in Figures 7, 8, and 9, a gas passageway is defined.

The plates 2 and 3 are separated in similar manner by thicker spacers 14 and 15. The spacer 15 is L-shaped, the leg of the L being designated 16. Between the plates 2 and 3 there is located a screen 5 for carrying a single layer of catalyst.

The screen 5 is provided with baffles 7 on its upper surface and with similar baffles 8 on the under surface which are in staggered relation to the baffles 7. The screen assembly is spaced from the plate 3 by a support 9.

By reference to Figures 7, 8, and 9 it will be seen that when the plates 2 and 3 are in assembled relation the screen 5 is held mid-way between the plates.

The plates 3 and 2 are separated by spacers 11 and 12 as are the plates 1 and 2. The passage 3—2 is about twice as deep as the passage 1—2 by reason of the spacers 11 and 12 in the former passage being thicker. This will be most easily seen on Figure 9.

A baffle 4 is located within the passage 3—2 and is held mid-way between the plates by rods 10 spot-welded along the edges of the baffle plates.

The remainder of the pack is a repetition of the plates 2, 3 as will be apparent.

The L-shaped spacers are located in such a way that all of the spaces 3—2 including a baffle are open on the right side so that incoming gases may enter, and the L-shaped members spacing the plates for the catalyst passage are located so that the openings are all on the left side, thus permitting the exit of sulfur dioxide gas at the left.

The pack in assembled relation is held together by fastening means 18 comprising angle bars which pass along the top and bottom of the assembly and bolts which pass thru the bars at their ends.

The assembled pack is held against the head plate 20 of a gas-tight cylinder 21 as is best shown in Figure 4. The projections 17 on the ends of the spacers form a ledge which the angle bar 19 engages. The angle is bolted to the drum head 20 as shown.

Gas is supplied to the right side of the pack by a header 22 as shown. Another header 23 on the left side of the pack provides for the exit of reacted gases. A by-pass 24 permits sulfur dioxide to be admitted at the back end of the tank 21 and thus pass directly into the catalyst passages without passing thru the heat exchange passages.

The reference numeral 25 indicates a pyrometer which is inserted in a suitable well.

It will be seen that in operation sulfur dioxide gases pass thru the header 22 into the heat exchange passages of the pack. The flow of gases will readily be apparent by reference to Figure 7. It will be seen that the top passage between the plates 1 and 2 and the similar bottom passage do not contain baffles but pass sulfur dioxide in heat exchange only with the wall which is common to the catalyst passage.

After the gases have been heated in the heat exchange passages they immerge at the end of the pack, which is open. Inasmuch as the tank 21 is gas-tight the sulfur dioxide gases can not escape but return thru the catalyst passages as indicated. It is to be observed that by enclosing the pack in a sealed drum as shown, the necessity for extreme gas tightness of the pack is to a considerable extent obviated. It is observed, however, that in commercial practice asbestos gaskets are used between the plates and spacers but even so absolute gas tightness is not a requirement.

While I have shown specific illustrative apparatus, it will readily be understood that those skilled in the art may make numerous changes in the details of mechanical construction and in the specific arrangement of elements without departing from the spirit of my invention.

I claim:

1. An internal heat exchange catalytic converter comprising contiguous catalytic and heat exchange passages the catalytic passage having a substantially single layer of pelleted catalyst so located that substantially every portion of the catalyst may lose heat to the passage walls by unimpeded radiation, the catalytic and heat exchange passages being provided with means causing the gas from the heat exchange to pass to the catalytic passage whereby the heat exchange passage serves to transfer to incoming gas the heat radiated by the catalyst and the preheated gases then pass to the catalytic passage.

2. An internal heat exchange catalytic converter comprising a plurality of spaced plates alternate spaces serving as heat exchange passages thru which incoming gases pass and are preheated and the remaining spaces containing a substantially single layer of pelleted catalyst spaced from the passage walls and so arranged that substantially every portion of the catalyst may exchange heat to the passage walls by unimpeded radiation.

3. An internal heat exchange catalytic converter comprising a plurality of spaced plates, each pair of plates being separated at parallel edges by a straight separator and one leg of an L-shaped separator, the second, entry-blocking, leg of the L-shaped separator extending towards but not reaching said straight separator whereby an entry is provided into the spaces between the plates the L-shaped separator between alternate pairs of plates having the entry-blocking leg of the L extending in a direction opposite to the direction of the entry-blocking leg of the L between a contiguous pair of plates, one set of passages formed between the spaced plates and all having an entry passage on the same side being provided with means for supplying gas, and the remaining passages being provided with a catalyst and with means for collecting the reacted gases.

4. An internal heat exchange catalytic converter comprising a plurality of spaced plates, each pair of plates being separated at parallel edges by a straight separator and one leg of an L-shaped separator, the second, entry-blocking, leg of the L-shaped separator extending towards but not reaching said straight separator whereby an entry is provided into the spaces between the plates the L-shaped separator between alternate pairs of plates having the entry-blocking leg of the L extending in a direction opposite to the direction of the entry-blocking leg of the L between a contiguous pair of plates, one set of passages formed between the spaced plates and all having an entry on the same side being provided with a header for supplying gas, the remaining passages being provided with a catalyst and with a header for collecting reacted gases, and a gas-tight receptacle enclosing the plurality of spaced plates.

5. An internal heat exchange catalytic converter comprising a plurality of spaced plates, each pair of plates being separated at parallel edges by a straight separator and one leg of an L-shaped separator, the second, entry-blocking, leg of the L-shaped separator extending towards but not reaching said straight separator whereby an entry is provided into the spaces between the plates the L-shaped separator between alternate pairs of plates having the entry-blocking leg of the L extending in a direction opposite to the direction of the entry-blocking leg of the L between a contiguous pair of plates, one set of passages formed between the spaced plates and all having an entry passage on the same side of the plates being provided with baffles spaced from the plates and parallel thereto, the remaining passages being provided with a catalyst carrier spaced from the plates and parallel thereto for receiving a layer of catalyst, a header for supplying gas to the first-named set of passages and a header for collecting the reacted gases from the other set of passages.

6. An internal heat exchange catalytic converter comprising a plurality of horizontal spaced plates, alternate spaces serving as heat exchange passages thru which incoming gases pass and are preheated and the remaining spaces containing a substantially single layer of pelleted catalyst which carries a catalytic material upon its surfaces whereby substantially every portion of the catalyst may exchange heat to the passage walls by unimpeded radiation, and means being provided to cause effluent gases from the heat exchange passages to flow to the catalyst-containing passages.

7. An internal heat exchange catalytic converter comprising a plurality of plates which are provided at parallel edges with separators which space the plates and define a gas passage between each pair of plates, means provided adjacent one end to supply gases to alternate gas passages and to collect gases from the remaining gas passages, the last-mentioned passages being provided with a catalyst, and gas-tight receptacle means into which said passages communicate whereby gases from the first-mentioned passages are caused to pass to the catalyst-containing passages.

8. An internal heat exchange catalytic converter comprising a plurality of plates which are provided at parallel edges with separators which space the plates and define a gas passage between each pair of plates, means provided adjacent one end to supply gases to alternate gas passages and to collect gases from the remaining gas passages, the last-mentioned passages being provided with a catalyst, and a gas-tight receptacle surrounding the plates whereby the gas passages at the end opposite the one above-mentioned open into the receptacle and permit the flow of gases from the first-mentioned set of gas passages to the other.

9. An internal heat exchange catalytic converter comprising a plurality of horizontal units, such units each being made up with three spaced plates, the space between the center plate and one of the outer plates defining a horizontal heat exchange passage through which incoming gases pass and are preheated, the space between said center plate and the remaining outer plate defining a horizontal catalyst passage which contains a substantially single layer of pelleted catalyst so located that substantially every portion of the catalyst may exchange heat to the passage walls by unimpeded radiation, a plurality of such units being disposed one above another and the units sharing outer walls so that the outer wall of the heat exchange passage of one unit is the outer wall of the catalyst passage of a contiguous unit, and gas conducting means for causing gas from a heat exchange passage to pass to a catalyst passage.

10. An internal heat exchange catalytic converter comprising a plurality of plates which are provided at parallel edges with separators which space the plates and define a gas passage between each pair of plates, means provided at one end of the plates to supply gases to alternate gas passages and means provided at the same end of the plates to collect gases from the remaining gas passages, the last mentioned passages being provided with means for supporting a thin layer of catalyst, and a gas-tight receptacle surrounding the plates whereby the gas passages at the end opposite the one above mentioned open into the receptacle and permit the flow of gases from the first mentioned set of gas passages to the other.

11. An internal heat exchange catalytic converter comprising a plurality of spaced plates which are provided at parallel edges with separators which space the plates and define a gas passage between each pair of plates, blocking means provided at one end of alternate gas passages the means extending from one of said edges towards the other and closing at least half of the opening into the gas passage, all of said means being similarly located in each of said alternate gas passages whereby all have an entry opening in the same relative position, and a header for supplying gas thru said openings to the said alternate passages, blocking means provided at the same said end for the remaining passages similar to the first mentioned means but extending from the opposite edge whereby the said remaining passages all have an exit opening in the same relative position but on the other side of said end from the aforementioned entry openings, a header for collecting gases from said remaining passages thru the exit openings, and the said remaining passages being provided with means for supporting a thin layer of catalyst.

DAVID M. HURT.